June 10, 1947. G. A. LYON 2,421,755
WHEEL COVER
Filed Nov. 1, 1943
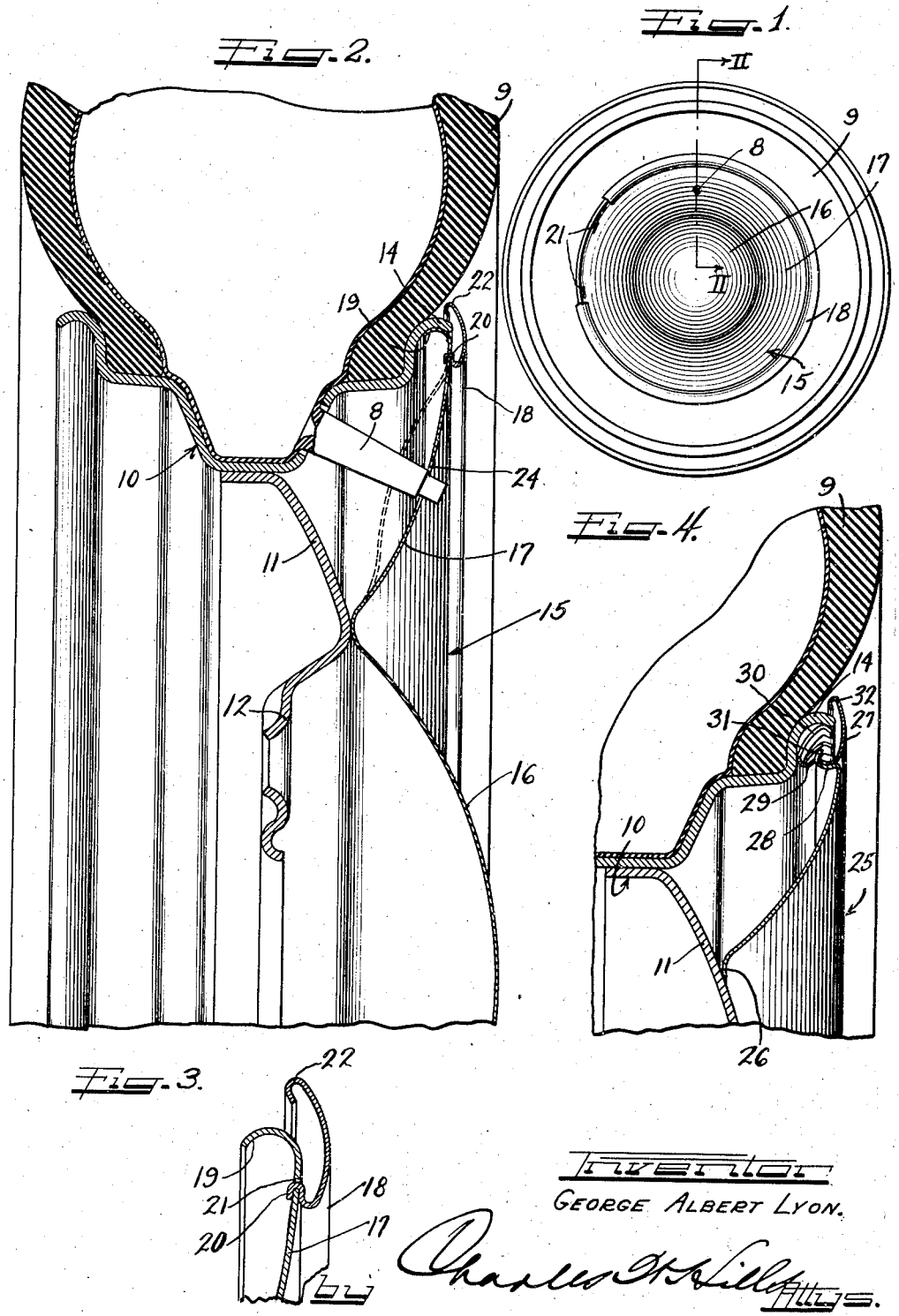
Inventor
GEORGE ALBERT LYON.

Patented June 10, 1947

2,421,755

UNITED STATES PATENT OFFICE 2,421,755

WHEEL COVER

George Albert Lyon, Allenhurst, N. J.

Application November 1, 1943, Serial No. 508,464

4 Claims. (Cl. 301—37)

This invention relates to a wheel structure, and more particularly to a wheel cover for the outer side of a wheel.

An object of this invention is to provide an improved light weight wheel cover which is properly reinforced at its point of detachable securement to the wheel.

Another object of this invention is to utilize reinforcing means in a wheel cover at its point of application to a wheel for the purpose of ornamenting the wheel cover and also concealing the fastening or retaining means.

A still further object of this invention is to provide an improved form of plastic wheel cover in which the weight is kept at a minimum and yet which is sufficiently rigidified at its point of attachment to the wheel to resist deformation.

Another and further object of this invention is to provide a wheel structure wherein a cover cooperates in an advantageous manner with the tire rim part of the wheel.

In accordance with the general features of this invention there is provided a wheel structure including tire rim and body members and a wheel cover for disposition over said members made of a resiliently deflectable, form-retaining plastic material having an outer peripheral portion provided with retaining means for detachable snap-on cooperation with the tire rim and also having a bead for rigidifying the cover at its point of attachment to the rim, as well as for concealing the retaining means and for ornamenting the peripheral margin of the cover at its junction with the tire on the rim.

Another feature of this invention relates to the provision of an article of manufacture in the form of a wheel cover of resilient, deformable plastic material and which resists permanent deformation by springing back to its normal position after deflection thereof, the cover having a reinforcing outer annular metallic bead interlocked with the outer margin of the cover by fingers on one extending through apertures in the other.

Still another feature of the invention relates to the provision of a metallic bead on the outer margin of a plastic cover, which bead is of a curved hollow formation and has its outer margin extending beyond and over the outer margin of the cover for the purpose of concealing an edge of the tire rim.

In accordance with still other features of this invention, there are provided two forms of the invention, in one of which the plastic cover itself has integrally formed thereon retaining means for the cover, and in the other of which the retaining means is formed on a metallic bead at the outer margin of the cover, both forms, however, having metallic outer beads for reinforcing the cover at its point of application to the wheel, as well as for establishing a color contrast between the cover proper and the side wall of the tire carried by the rim of the wheel.

Other objects and features of this invention will more fully appear from the following detailed description, taken in connection with the accompanying drawings, which illustrate several embodiments thereof, and in which Figure 1 is a side elevation of a wheel structure embodying the features of this invention and partly broken away to show the manner in which the bead is interlocked with the outer peripheral margin of the plastic wheel cover.

Figure 2 is an enlarged fragmentary cross-sectional view taken on the line II—II of Figure 1, looking in the direction indicated by the arrows and showing in dotted lines the manner in which the ring portion of the cover may be deflected for the purpose of rendering the valve stem accessible;

Figure 3 is a fragmentary enlarged cross-sectional view corresponding to the upper-right-hand portion of Figure 2 at the locale of the bead; and Figure 4 is an enlarged fragmentary cross-sectional view similar to Figure 2 illustrating a modification of the invention wherein the retaining means, instead of being on the plastic cover, is mounted on the bead disposed at the outer periphery of the cover.

As shown on the drawings:

The reference character 9 designates generally a conventional type of tire equipped with the usual pneumatic tube and valve stem 8. This tire is mounted upon a conventional multi-flanged, drop-center tire rim member 10 which is in turn supported by a load bearing member or body, sometimes called a spider, 11.

The spider 11 is of a dished or shell-like configuration and, as is well known, usually comprises a stamping. It has a central recessed section 12 which constitutes the flange for attaching the wheel to the usual support on an axle as by means of bolts or cap screws (not shown).

Associated with this conventional type of automotive vehicle wheel is a circular wheel cover designated generally by the reference character 15 embodying the features of the invention. This wheel cover is preferably made of a synthetic plastic material possessed of resilient properties and yet being resistant to permanent deformation. Excellent results may be attained by making this wheel cover of a plastic material such as ethyl cellulose. In any event, the material used must result in the cover being form-sustaining and which will cause the cover to spring back into its original contour upon deflection or indentation of the same.

The wheel cover proper embraces a central dome-like hub cap portion 16 and an outer annular ring-like portion 17. Also it should be noted that the cover includes as a part of it a metal reinforcing bead 18. This bead may be made of any suitable metallic sheet, although I contemplate making it of stainless steel so as to give it a highly lustrous external finish.

The metal bead 18 is of a hollow cross-sectional contour and has its inner marginal edge turned back upon itself and formed into fingers 20 which extend through apertures 21 formed in the ring portion 17 of the cover. These fingers and apertures may be of any suitable number and extend in spaced relation clear around the cover in a common circle. In attaching the metal bead 18 to the marginal portion of the cover, the fingers 20 are first extended through the aligned openings 21 and are then bent radially inwardly so as to lock the bead 18 to the peripheral portion of the plastic cover 15.

The outer edge of the annular bead 18 is likewise turned back upon itself at 21 and overlies the outer edge or flange 14 of the tire rim so as to conceal the same adjacent the junction of that edge with the outer side wall of the tire.

It will be appreciated that when the bead 18 is interlocked with the outer marginal edge of the plastic cover 15, it comprises a unitary part of the cover and is applicable for attachment to and detachment from the wheel by the manipulation of the main part of the cover.

The cover 15 is retained on the wheel by a snap-on resilient cooperation between the curved outer edge 19 of the cover which is adapted to be pressed axially into retained engagement with the curved undercut surface of the outer edge flange 14 of the rim. The turned hollow bead-like edge 19 of the plastic cover is of a diameter slightly in excess of that of the cooperating surface of the flange edge 14 so that it is under stress when it is in the retaining position shown in Figure 2. Thus the cover may be applied to the wheel by merely pressing it axially into retaining cooperation with the edge flange 14 of the tire rim.

When it is desired to remove the cover, such removal may be easily effected by inserting a pry-off tool under the edge 22 of the bead 18 which is an integral part of the cover and by exerting a pry-off force on such bead which results in the turned edge 19 being forcibly ejected out of retaining engagement with the rim.

It should also be noted that when it is desired to have access to the valve stem 8 the same may be effected by depressing a portion of the ring part 17 inwardly in the vicinity of the valve stem to the dotted line position shown in Figure 2. This action results in the valve stem being projected further out through the opening or aperture 24 in the ring portion 17.

Upon the release of the deflected portion due to the inherent resiliency of the cover this portion immediately springs back to its normal contour.

Attention is further directed to the fact that the ring portion 17 of the plastic cover 15 is of a convex-concave contour and extends inwardly to a point adjacent the recessed section 12 of the spider 11. By finishing the exterior surface of this portion 17 in white, it is possible to cause it to appear to be a part of the side wall of the tire due to the fact that the curvature of this ring portion 17 is such that it appears to be a continuation of the curvature of the side wall of the tire. In addition, a very pleasing contrast in colors is feasible with this arrangement since the lustrous bead 18 is set off in contrast as against the side wall of the tire and the ring portion 17. Needless to say, any desired color combination may be obtained by this arrangement.

In Figure 4 I have illustrated a modification of the invention wherein the parts of the wheel are designated by the same reference numerals as are employed in the first form due to the fact that the wheel and tire are of the same construction. The cover, however, is of a slightly different construction and this is designated generally by the reference character 25. This cover instead of being in the form of a solid disk is in the form of an annular ring and has an inner peripheral edge slightly turned at 26 so as to abut the outer surface of the wheel body or spider 11. The plastic cover 25, like the cover 15, carries an outer metal re-enforcing bead 27 which is quite similar in contour to that of the bead 18 insofar as its outer appearance is concerned. This bead 27 has a rearwardly turned inner flange 29 formed into retaining inclined fingers 30 for cooperation with the rim flange or edge 14. The outer edge of each of these fingers 30 is slightly turned back upon itself so as to facilitate application to and removal of the cover from the wheel. The outer marginal edge 28 of the plastic part of the cover 25 has a plurality of radially outwardly turned fingers 31 which extend through corresponding openings in the flange 29 of the bead 27 so that the cover is in this way anchored to the bead. This arrangement is the reverse of that shown in Figure 2 in that the fingers are on the cover and the apertures are in the bead.

The outer marginal edge of the metal or stainless steel bead 27 is formed into a rearwardly turned flange or edge 32 which overhangs the edge flange 14 of the tire rim 10 and is in close proximity to the side wall of the tire 9. Thus the bead conceals the edge of the rim and also conceals the retaining fingers 30 therebehind.

The application of this cover 25 including its bead 27 to the wheel is similar to that of the first described form. By this it is meant that the cover is pressed axially home into retaining engagement with the flange 14 of the rim and in so manipulating the cover the resilient fingers 30 are cammed into retaining engagement with the undercut surface of the flange 14 thus exerting a resilient or stress retaining pressure against that flange which is sufficient to hold the annular cover on the wheel.

Removal of the cover may be easily effected by inserting the edge of a pry-off tool under the turned edge 32 of the bead 27 and by exerting a twisting or pry-off pressure against this edge 32 which results in the release of the spring fingers 30 from their retaining engagement of the rim flange 14.

Attention is also directed to the fact that the cover 25 may be made of the same material as the cover 15 and that likewise the bead 27 may be made of the same material as the bead 18; the construction of these parts giving the same advantage as that obtained in the case of the first described form of the invention.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. As an article of manufacture, a circular wheel cover member of resilient, deformable plastic material and which resists permanent deformation by springing back to normal position after deflection thereof, said cover member having a re-enforcing annular metallic bead secured to the outer margin thereof, one of said members having resilient axially rearwardly extending wheel attachment means, and said members being interlocked by fingers on one member extending through apertures in the other member, the interlocked junction of said members comprising a rigid annular area relative to which the cover member is flexible in an axial direction radially inward thereof.

2. In a wheel structure including a multi-flanged tire rim part and a central body part, a cover for the outer side of said wheel made of resiliently pliable material self-sustaining as to form, yet deflectable without permanent distortion, said cover having an outer turned margin defining an annular hollow bead portion facing radially outwardly and of a diameter such as to resiliently and tightly nest in a curved outer flange of the rim part and a reinforcing hollow annular bead directly opposite an axially outer side of said bead portion and having a radially outer edge overlapping the outer edge of said rim flange and also having a radially inner edge interlocked with said cover and said bead portion for protecting and concealing said bead portion.

3. In a wheel structure including a multi-flanged tire rim part and a central body part, said rim part having a radially outer turned curved edge a cover for disposition over a side of said wheel including a circular member of self-sustaining resiliently pliable material sharply deflectable without permanent deformation, said member having an axially inwardly turned flange in resilient nested engagement with said turned edge of the rim part, said cover also including an annular relatively rigid reinforcing outer marginal portion secured to said circular member radially inwardly of said turned flange, said reinforcing portion extending radially outwardly beyond said rim edge to conceal the same and extending radially inwardly to conceal the junction with said circular member, the engagement of said turned flange with said rim turned edge maintaining said cover detachably retained on the wheel.

4. In a cover structure for a wheel including a central body part, a multi-flanged tire rim carried thereby and including a turned radially outer edge, a cover for the outer side of said wheel made of resiliently flexible material self-sustaining as to form and yet deflectable without permanent distortion, said cover having a radially outer margin including an axially rearwardly curved retaining section of such diameter as to nest in said turned outer edge of the rim, said outer margin of the cover including a reinforcing outer annular metal bead for lapping and concealing the extremity of said curved rim edge and for reinforcing the cover at its area of retention on the wheel and relative to which a radial inner portion of the cover is transversely flexible.

GEORGE ALBERT LYON.

REFERENCES CITED

The following references are of record in the file of this patent:

UNITED STATES PATENTS

| Number | Name | Date |
| --- | --- | --- |
| 2,135,757 | Lyon | Nov. 8, 1938 |
| 1,234,387 | Pugh et al. | July 24, 1917 |